United States Patent [19]

Arfaei et al.

[11] Patent Number: 5,211,751
[45] Date of Patent: May 18, 1993

[54] HYDRAULIC CEMENT SET-ACCELERATING ADMIXTURES INCORPORATING AMINO ACID DERIVATIVES

[75] Inventors: Ahmad Arfaei, Milford; Leslie A. Jardine, Tewksbury; Ara Jeknavorian, Chelmsford, all of Mass.

[73] Assignee: W.R. Grace & Co.-Conn., New York, N.Y.

[21] Appl. No.: 842,912

[22] Filed: Feb. 28, 1992

[51] Int. Cl.$^5$ ............................................. C04B 24/12
[52] U.S. Cl. ..................................... 106/727; 106/808; 106/819; 106/823
[58] Field of Search ............... 106/727, 808, 819, 823; 528/262

[56] References Cited

U.S. PATENT DOCUMENTS

| | | | |
|---|---|---|---|
| 2,389,416 | 11/1945 | D'Aiello | 528/262 |
| 2,512,720 | 6/1950 | Keim | 528/262 |
| 2,550,639 | 4/1951 | Dawson | 8/94.21 |
| 2,793,129 | 5/1957 | Klein | 106/727 |
| 3,325,105 | 6/1967 | Veltman | 241/16 |
| 3,459,570 | 8/1969 | Serafin | 106/727 |
| 3,689,296 | 9/1972 | Landry | 106/727 |
| 3,767,436 | 10/1973 | Peppler et al. | 106/823 |
| 3,864,290 | 2/1975 | Peppler et al. | 524/6 |
| 4,026,723 | 5/1977 | Grof et al. | 106/823 |
| 4,116,706 | 9/1978 | Previte | 106/727 |
| 4,365,999 | 12/1982 | Fujita et al. | 106/727 |
| 4,454,311 | 6/1984 | Burge et al. | 528/245 |
| 4,606,677 | 8/1986 | Gerber | 106/727 |
| 4,747,877 | 5/1988 | Braun | 106/823 |
| 4,818,288 | 4/1989 | Aignesberger et al. | 106/725 |
| 4,897,120 | 1/1990 | Pistilli | 106/823 |

FOREIGN PATENT DOCUMENTS 0077904 9/1982 European Pat. Off. .

*Primary Examiner*—Mark L. Bell
*Assistant Examiner*—Deborah Jones
*Attorney, Agent, or Firm*—Nicholas P. Triano, III; John J. Wasatonic; William L. Baker

[57] ABSTRACT

New set-accelerating admixtures for hydraulic cement compositions are disclosed. These admixtures incorporate set-accelerating compounds and methylol derivatives of amino acids, are found to be surprisingly effective in decreasing the initial set time of hydraulic cements, mortars, and concretes, and are particularly advantageous in reduced-temperature set-accelerators.

44 Claims, No Drawings

HYDRAULIC CEMENT SET-ACCELERATING ADMIXTURES INCORPORATING AMINO ACID DERIVATIVES

FIELD OF THE INVENTION

This invention relates to improvements in set-accelerating admixtures for hydraulic cement compositions such as mortars, grouts and concretes. More particularly the invention relates to novel set-accelerating admixtures and methods for set acceleration employing methylol derivatives of amino acids.

BACKGROUND OF THE INVENTION

Set accelerators are used when it is necessary to work with hydraulic cement compositions at freezing or near-freezing temperatures. The rate of hydration of Portland cement, for example, is very dependent on temperature; Portland cement compositions will often harden at a rate slower than desired unless the hardening process is accelerated. In addition to accelerating the set, it is desirable to also attain an increase in the rate of early strength development at normal or low temperatures. This reduces curing and protection periods necessary to achieve specified strengths in concrete. Some techniques for accelerating the set are: increasing the proportion of cement in the mix, heating the components used in the mix, and using chemical admixtures that act on the components of the mix to increase the rate at which the cement paste sets.

Several chemical set accelerators are well-known. They include alkali hydroxides, silicates, fluorosilicates, calcium formate, sodium chloride, calcium chloride, and calcium nitrate and calcium nitrite.

Calcium chloride is widely used because it is easy and inexpensive to produce; its effects on hydraulic cement are also predictable and well-documented. However, like sodium chloride, it has the disadvantage of corroding steel. Thus, its presence in sufficient amounts can weaken concrete containing steel reinforcing bars which have corroded. Other drawbacks of calcium chloride use include reduced compressive strength at later ages, reduced response to air entrainment, and blotching of hardened concrete surfaces (Dodson, *Concrete Admixtures*, Van Nostrand Reinhold, 1990).

In light of this there is a continuing need in the art for improved set-accelerating admixtures. In particular, there is a need for stable, safe and inexpensive set accelerators which may be easily admixed into cement compositions, and which are additionally advantageous for use as cold-weather set accelerators.

It is thus an object of this invention to provide a new class of set-accelerating admixtures which possess the above qualities and which are particularly advantageous in reducing the set time of hydraulic cement compositions at reduced temperatures. Further objects of the invention are to provide cement compositions containing the set accelerators of this invention, and to provide methods for reducing the set time of hydraulic cements.

SUMMARY OF THE INVENTION

This invention is directed toward new hydraulic cement set-accelerating admixture compositions. The admixture compositions comprise a set-accelerating compound and an amine compound of the formula

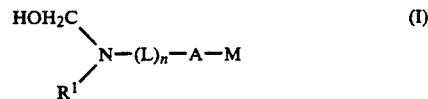

wherein L is a divalent organic linking group, n is 0 or 1, A is an acidic group, $R^1$ is a methylol group, hydrogen, or a group which is linked to L to form an aliphatic ring structure, and M is either hydrogen or a cation. The invention further relates to cement compositions comprising a hydraulic cement, a set-accelerating compound and an amine compound of Formula (I), and to a method of reducing the set time of a hydraulic cement composition comprising the step of adding to a cement composition, either separately or as a mixture, a set-accelerating compound and an amine compound of formula (I).

DESCRIPTION OF THE INVENTION

It has been found that admixtures comprising a set-accelerating compound and compounds of Formula (I), which are obtained by methylol-derivatization of amino acids, are surprisingly effective in reducing the set time of hydraulic cement compositions. In particular, it has been found that the methylol-derivatized amino acids provide substantial enhancement of the set acceleration of the set-accelerating compound. Such admixtures are found to be particularly effective at lower working temperatures, i.e., below about 50° F. Further, admixtures of this invention may be formulated in such a way as to produce a composition that will not induce corrosion in steel reinforcing bars commonly imbedded in cement compositions.

The term "cement composition" as used herein refers to pastes, mortars and concrete compositions comprising a hydraulic cement binder. The above terms are terms of art. Pastes are mixtures composed of a hydraulic cement binder, for example, Portland cement, either alone or in combination with fly ash, silica fume or blast furnace slag, and water; mortars are pastes additionally including fine aggregate, and concretes are mortars additionally including coarse aggregate. Such compositions may additionally include other admixtures such as defoaming agents, air-entraining or detraining agents, set retarders, water reducing agents, superplasticizers, and other components known to those in the art for altering properties of the composition. The cement compositions of this invention are formed by mixing required amounts of certain materials, e.g., a hydraulic cement, water, and fine or coarse aggregate, as may be applicable for the particular cement composition being formed.

The set-accelerating compound may be any compound which, when added to a cement composition (as described above), reduces the amount of time required for the cement composition to harden. For example, an alkali or alkaline earth metal salt which is a salt of an organic or inorganic acid may be employed. Although the following list is not meant to be limiting, examples of these compounds are alkali or alkaline earth metal nitrate, nitrite, and formate; alkali or alkaline earth metal salts of Group VI halogen and pseudohalogen acids, such as alkali or alkaline earth metal chloride, bromide, iodide, thiocyanate, thiosulfate and perchlorate; and alkali or alkaline earth metal aluminates, silicates, and hydroxides, e.g., sodium hydroxide. Calcium salts are particularly advantageous, especially calcium nitrate, calcium nitrite, calcium chloride, and calcium formate, with calcium nitrate being especially effective. It is also feasible to use a mixture of alkali or alkaline earth metal salts, for example, a mixture of calcium nitrate and calcium nitrite. Any ratio of the salts used may be employed; in a preferred calcium nitrate/nitrite mixture, a range of weight ratios of from about 1:3 to 3:1 may be used. When such preferred salts are used in set-accelerating additives of the invention, subsequent addition of these additives to a cement compositions will not induce corrosion in steel reinforcing bars imbedded in the cement composition.

Other set-accelerating compounds (such as alkanolamines like triethanolamine) are suitable for use in the invention and will be apparent to those of ordinary skill in the art.

The methylol-derivatized amino acid of the invention is an amine compound of the formula

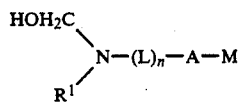  (I)

wherein L is a divalent organic linking group, n is 0 or 1, A is an acidic group, $R^1$ is a methylol group, hydrogen, or a group which is linked to L to form an aliphatic ring structure, and M is either hydrogen or a cation.

When n is 1, the divalent organic linking group L may be an aliphatic or aromatic moiety, or a moiety having both aromatic and aliphatic groups. Examples of these linking groups may be found in the α-amino acids, wherein the linking group is of the general formula

wherein $R^2$ may be an aliphatic or aromatic moiety, or a moiety having both aromatic and aliphatic groups, such as the following $R^2$ groups for the α-amino acids glycine, alanine, valine, leucine, isoleucine, phenylalanine, asparagine, glutimine, trypotophan, serine, threonine, tyrosine, cysteine, methionine, aspartic acid, glutamic acid, lysine, and histidine, respectively:

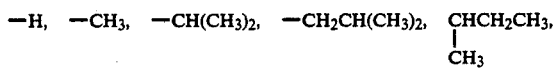

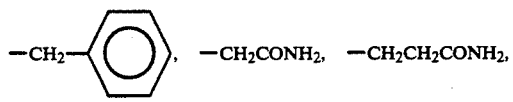

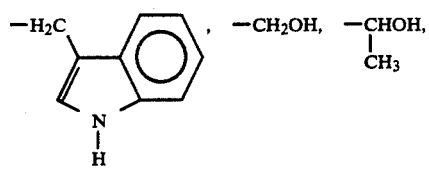

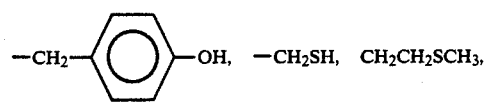

-continued

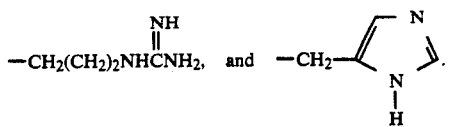

The divalent linking group L may also be linked to $R^1$ to form an aliphatic ring structure. This is best illustrated by the methylol derivative of the amino acid proline, having the structure:

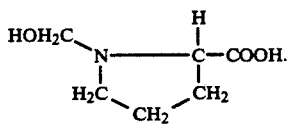

The types of divalent organic linking groups described herein are only meant for illustration, and not as a limitation on the invention. n may also be 0; in this case there will simply be a chemical bond between the amino nitrogen N and the acidic group A, as will be described below.

The acidic group A may be either a carboxylate group ($-COO^-$), sulfonate group ($-SO_3^-$), or phosphonate ($-PO_3^-$). The cation M may be a cation of an alkali metal such as sodium or potassium, an alkaline earth metal like magnesium or calcium, or an organic base. Alkali metal cations, like that of sodium, are preferred.

The compound of Formula I is made by reacting an amino acid in any suitable manner that will cause one or both of the hydrogens of the amine group to be replaced with a methylol group. A suitable way to do this is to react the amino acid with formaldehyde in a desired molar ratio, as described hereinbelow.

The term "amino acid" as used herein is meant to include all amine-containing organic compounds of the formula

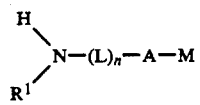

wherein L, n, A, $R^1$, and M are as defined above. Amino acids wherein the acidic group A is a carboxylic acid group include the α-amino acids described herein. A preferred amino acid of this type for use in the invention is glycine.

The acidic group A may alternately be a sulfonate group. Amino acids containing this acidic group include sulfamic acid, sulfanilic acid, aminomethanesulfonic acid, and aminoethanesulfonic acid (taurine). It may be seen that in sulfamic acid n is equal to 0 and, as such, there is a chemical bond between the nitrogen and the sulfonate group. In sulfanilic acid, amino-methanesulfonic acid, and aminoethanesulfonic acid, n is equal to one and the divalent organic linking group is a phenyl group, a methylene group, and an ethylene group, respectively. A preferred acid containing the sulfonate group is sulfamic acid.

In a preferred embodiment, the compound of Formula I is made in the following manner. An amino acid is neutralized with an amount of an alkali metal base, preferably an aqueous solution of sodium hydroxide, necessary to form the salt. The product that results is then maintained at a constant temperature while a stoichiometric amount of formaldehyde is added gradually to the vessel. After the addition of the desired amount of formaldehyde, the mixture is stirred for an additional time.

The reaction is stoichiometric, i.e., a 1:1 molar ratio of amino acid:formaldehyde results in a monomethylolated product. For example, in the reaction of one mole of formaldehyde with one mole of glycine, the following product is formed:

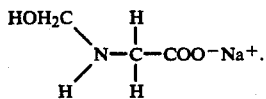

As greater amounts of formaldehyde are added to the amino acid in ratios of amino acid to formaldehyde greater than 1:1, e.g., 1:1.5 or 1:2.0, a proportionate amount of the di-methylolated amino acid is produced (from an amino acid having two amino hydrogens). At these higher ratios, a mixture of mono- and di-methylolated amino acids results. The inventors have discovered that although effective set acceleration may be obtained with using the mono-methylolated amino acid of this invention, better set acceleration may often be obtained by using either a mixture of mono- and di-methylolated amino acids or the pure di-methylolated amino acid in the invention. Effective molar ratios of mono- to di-methylolated amino acid range generally from about 1:0.001 to 0.001:1, with a particularly effective range of ratios from about 1:0.25 to 1:4.

It has surprisingly been found that a combination of the methylolated amino acid of Formula I and a set-accelerating compound significantly increases the set acceleration of a cement composition over that obtained by the addition of the set-accelerating compound alone to the cement composition. Thus it is within the scope of the invention that the methylolated amino acid of Formula I may be added separately to a wet cement composition already containing a set-accelerating compound, in such amounts as necessary to give the set acceleration of the cement composition containing the set accelerator a desired "boost."

If the set-accelerating compound and the compound of Formula I are added to the cement composition separately, the compound of Formula I may be added, generally, in percent solids on solids ("% s/s"), in the range of about 0.001% s/s to 0.5% s/s (based on the weight of hydraulic cement binder in the cement composition), with a preferred range of from about 0.005% s/s to 0.1% s/s, such concentrations being generally those which provide the desired boost in acceleration. The set-accelerating component may be added in the usual amounts necessary for set acceleration, but generally in a range of from about 0.05% s/s to about 4.0% s/s. (Note that through the use of the methylolated amino acid of Formula I, it is also possible to reduce the amount of set accelerator compound normally required for a certain level of set acceleration, because of the better set acceleration provided by the combination of the methylolated amino acid of the invention and the set accelerator compound.)

However, the inventors find it is preferable to combine the compound of Formula I and the set-accelerating compound in desired amounts before addition to a cement composition, so only one composition need be metered out and added to the cement composition. This is a simpler and more precise method than adding each component separately, and reduces the opportunity for error in dispensing the correct formulation. If the set-accelerating compound and compound of Formula I are to be mixed before addition to a cement composition, the compound of Formula I and the set-accelerating compound may be combined in any desired proportion effective to give the desired results. Generally, the amount of the compound of Formula I in the mixture may range from about 0.5 to 20 weight % (based on the combined weight of methylolated amino acid and set-accelerator compound), and more preferably from about 2 to 15 weight %.

An admixture of the invention should be mixed into a hydraulic cement composition in an amount effective to allow the acceleration desired. The specific amount of admixture can be readily determined and will depend on the cement composition, the ratio of components of the composition, and the degree of acceleration desired. Generally, the amount will be at least 0.1 weight %, and usually in the range of 0.2 to 3.0 weight %, based on the amount of hydraulic cement binder in the composition. A more preferred amount, similarly based, is about 0.5 to 2.0 weight %, such concentrations being generally those which provide the desired boost in acceleration.

The admixtures of this invention can be added to cement compositions in any conventional manner familiar to those in the art. The admixture should be substantially uniformly mixed with the cement composition.

The following examples are given for illustrative purposes only. Unless otherwise indicated, all parts and proportions are by weight.

EXAMPLE 1

A methylolated amino acid product was made in the following manner. To a glass reaction vessel fitted with a stirring rod equipped with a TEFLON ® paddle was added 192.0 g of distilled water, 300.0 g of an aqueous solution of sodium hydroxide (40% NaOH by weight), and 225.0 g of glycine. The components were mixed for about 1 to 2 minutes, then the pH of the mixture was adjusted to about 9.0 with the 40% NaOH solution.

The mixture was returned to room temperature (25° C.) by immersing the vessel in a bath of cool water, then 243 g of a 37% solution of formaldehyde in water (formalin), was added incrementally to the mixture over 1 hour. The molar ratio of amino acid to formaldehyde was, accordingly, 1:1. After formaldehyde addition was completed, the mixture was stirred for an additional hour, yielding a product having about 36% total solids.

EXAMPLE 2

A methylolated glycine product was made in the same manner as in Example 1, except that 127.8 g of distilled water and 364.5 g of formalin were used. The molar ratio of amino acid to formaldehyde was, accordingly, 1:1.5.

EXAMPLE 3

A methylolated glycine product was made in the same manner as in Example 1, except that 96.0 g of distilled water and 486.0 g of formalin were used. The molar ratio of amino acid to formaldehyde was, accordingly, 1:2.0.

EXAMPLE 4

A methylolated amino acid product was made in the same manner as Example 1, substituting 73.0 g of sulfamic acid for the glycine, and using 75.0 g of 40% NaOH (aqueous), 60.0 g of distilled water, and 91.2 g of formalin.

EXAMPLE 5

A set accelerating admixture was made in the following manner. To a glass flask were added, in this order, 42.0 g of calcium nitrate, 34.0 g of calcium nitrite and 9.0 g of 0.1N NaOH (aqueous). The pH of the methylolated glycine product of Example 1 was verified that it was pH 8 to 9, then 13.8 g of the product of Example 1 was added to the flask, followed by 1.2 g of distilled H$_2$O. The mixture was then stirred thoroughly to mix.

EXAMPLE 6

A set accelerating admixture was made in the same manner of Example 5, using the methylolated glycine product of Example 2.

EXAMPLE 7

A set accelerating admixture was made in the same manner of Example 5, using the methylolated glycine product of Example 3.

EXAMPLE 8

A set-accelerating admixture containing calcium chloride was made in the following manner. 271 g of an aqueous solution containing 92.95 g of CaCl$_2$ and 1.90 g of triethanolamine was mixed with 11.1 g of the methylolated glycine product of Example 3.

EXAMPLE 9

Another set-accelerating admixture containing calcium chloride was made as in Example 1, except that 11.1 g of the methylolated sulfamate product of Example 4 was substituted for the methylolated glycine product of Example 3.

EXAMPLE 10

A set accelerating admixture was made in the following manner. To a glass flask was added, in this order, 39.0 g of calcium nitrate, 28.0 g calcium nitrite and 9.0 g of 0.1N NaOH (aqueous). The pH of the product of Example 3 was verified that it was about pH 8 to 9, then 15.0 g of the product was added to the flask, followed by 9.0 g of distilled H$_2$O. The mixture was then stirred thoroughly to mix.

EXAMPLE 11

A set accelerating admixture according to Example 10 was made, omitting the methylolated glycine product of Example 3.

EXAMPLE 12

The admixtures prepared in Examples 3, 10 and 11 were each added individually to mortars prepared using a Type I-II Portland cement ("Cement 2"), sand, and a water to cement ratio of 0.54. A blank mortar, containing no admixture, was also prepared. Each mortar was prepared by combining 4500 g of sand, 900 g of H$_2$O, and 2000 g of cement in a Hobart mixer until homogeneous. A sufficient amount of the admixture solution of Example 3 was added to provide an admixture solids concentration of 0.082%, of the admixture solution of Example 10 to provide an admixture solids concentration of 0.519%, and of the admixture solution of Example 11, to provide an admixture solids concentration of 0.601%, based on the weight of Portland cement in the mortars (expressed as percent solids on solids, or "% s/s".) Set times were measured in accordance with ASTM C403. The test was performed at 40° F. in duplicate.

Table 1 presents the data, showing the substantially increased cold temperature set acceleration with the combination of the nitrate/nitrite set accelerator and the methylolated glycine (admixture "10"), as compared to that obtained with either the methylolated glycine (admixture "3") or the nitrate/nitrite set accelerator (admixture "11") individually.

TABLE 1

| Admixture of Example No. | Initial Set Time (hr:min) | Change in Initial Set Time |
|---|---|---|
| — | 9:33 | 0:00 |
| 3 | 8:57 | −0:36 |
| 11 | 8:29 | −1:04 |
| 10 | 5:06 | −4:27 |

EXAMPLE 13

The admixtures prepared in Examples 5 through 7 were added to individual mortars each prepared using two different Type I-II and one Type I Portland cement (Cements "1", "2", and "3", respectively), sand, and a water to cement ratio of 0.46. Blank mortars of each type of cement, containing no admixture, were also prepared. Each mortar was prepared as described above, and a sufficient amount of each admixture solution was added to provide an admixture solids concentration of 0.60%, based on the weight of Portland cement in the mortars (expressed as % solids on solids, or "% s/s".) Set times were measured in accordance with ASTM C403. The tests were performed at 40° F.

Table 2 presents the data, which demonstrate that admixtures comprising an alkaline earth metal salt and a mixture of mono- and di-methylolated amino acids according to the invention are effective set accelerators for a variety of different cement types. The relative proportions of the mono- and di-methylolated amino acids may thus be varied to give a desired set acceleration with a given cement.

TABLE 2

| Admixture of Example No. | Initial Set Times (hr) | | |
|---|---|---|---|
| | Cement 1 | Cement 2 | Cement 3 |
| — | 8.16 | 9.11 | 10.01 |
| 5 | 5.17 | 7.01 | 5.21 |
| 6 | 2.93 | 4.91 | 4.59 |
| 7 | 3.12 | 3.55 | 4.53 |

EXAMPLE 14

The admixtures prepared in Example 8 and 9 were each added individually to mortars prepared using a Type I Portland cement ("Cement 2"), sand, and a water to cement ratio of 0.46. A blank mortar, containing no admixture, was also prepared. Each mortar was prepared as described above, and a sufficient amount of each admixture solution was added to provide an admixture solids concentration of 0.5%, based on the weight of Portland cement in the mortars (expressed as % solids on solids, or "% s/s".) Set times were measured in accordance with ASTM C403. The test was performed at 40° F.

Table 3 presents the data, which demonstrate that incorporating a methylolated amino acid of the invention with a conventional set-accelerating compound (CaCl₂) is effective to accelerate the set of cement compositions.

TABLE 3

| Admixture of Example No. | Initial Set Time (hr:min) | Change in Initial Set Time |
| --- | --- | --- |
| — | 5:23 | 0:00 |
| 8 | 3:31 | −1:52 |
| 9 | 3:21 | −2:01 |

EXAMPLE 15

A set-accelerating admixture comprising 0.900% (s/s) calcium formate and 0.100% (s/s) of the glycine adduct of Example 3 was prepared and added individually to mortars prepared similarly to Example 14. A blank mortar was also prepared.

Table 4 presents the data, which demonstrate the effectiveness of a methylolated amino acid of the invention in increasing the performance of another set-accelerating compound in hydraulic cement compositions.

TABLE 4

| Admixture of Example No. | Initial Set Time (hr:min) | Change in Initial Set Time |
| --- | --- | --- |
| — | 5:29 | 0:00 |
| 8 | 1:51 | −3:38 |
| 9 | 3:21 | −2:01 |

It should be noted that the above examples and description of the preferred embodiments of the invention are intended to illustrate the invention and are not meant as a limitation on it. It is intended that modifications, variations and changes to the invention may be made within the scope of the appended claims without departing from the spirit and scope of the present invention.

What is claimed is:

1. A cement admixture composition comprising a set-accelerating compound and a first compound of the formula

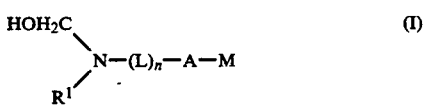

wherein L is a divalent organic linking group, n is 0 or 1, A is an acidic group, R¹ is a methylol group, hydrogen, or a group which is linked to L to form an aliphatic ring structure, and M is either hydrogen or a cation.

2. The admixture of claim 1 wherein R¹ of said first compound is hydrogen or a group which is linked to L to form an aliphatic ring structure and said admixture additionally comprises a second compound of said formula (I), wherein R¹ of said second compound is a methylol group.

3. The admixture of claim 2 wherein said first and second compounds are present in a molar ratio of from about 1:0.001 to 0.001:1.

4. The admixture of claim 2 wherein said first and second compounds are present in a molar ratio of from about 1:0.25 to 1:4.

5. The admixture of claim 1 wherein A is a carboxylate group, M is an alkali metal cation, L is of the formula

and R² is selected from the group consisting of:

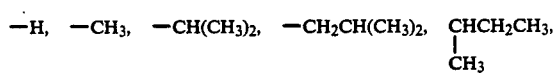

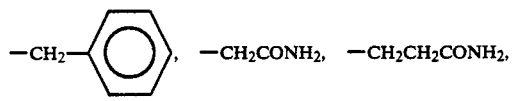

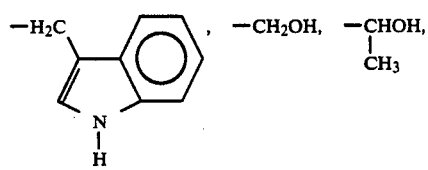

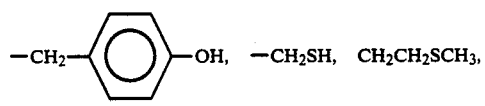

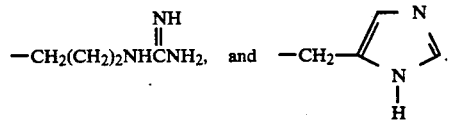

6. The admixture of claim 2 wherein A is a carboxylate group, M is an alkali metal cation, L is of the formula

and R² is selected from the group consisting of:

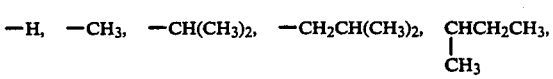

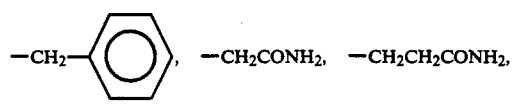

-continued

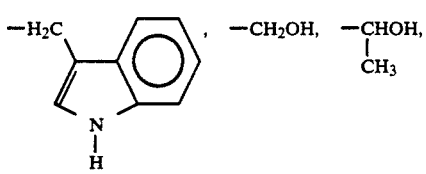, —CH₂OH, —CHOH, | CH₃

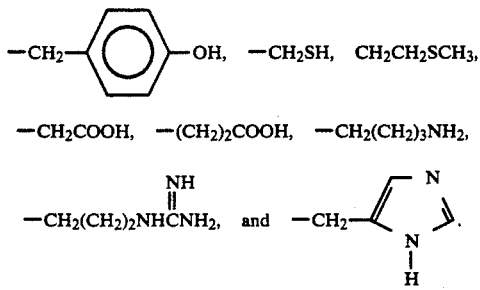

—CH₂COOH,  —(CH₂)₂COOH,  —CH₂(CH₂)₃NH₂,

—CH₂(CH₂)₂NHC(=NH)NH₂,  and  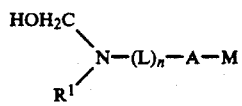.

7. The admixture of claim 5 wherein R² is —H.
8. The admixture of claim 6 wherein R² is —H.
9. The admixture of claim 1 wherein n is one, A is a sulfonate group and L is a phenyl group, a methylene group, or an ethylene group.
10. The admixture of claim 2 wherein n is one, A is a sulfonate group and L is a phenyl group, a methylene group, or an ethylene group.
11. The admixture of claim 1 wherein n is 0 and A is a sulfonate group.
12. The admixture of claim 2 wherein n is 0 and A is a sulfonate group.
13. The admixture of claim 1 wherein said set-accelerating compound is an alkali or alkaline earth metal salt of an organic or inorganic acid, or a mixture thereof.
14. The admixture of claim 13 wherein said set-accelerating compound is selected from the group consisting of calcium nitrate, calcium nitrite, calcium chloride, calcium formate, and mixtures thereof.
15. The admixture of claim 1 wherein said set-accelerating compound is alkali or alkaline earth metal thiocyanate or alkali or alkaline earth metal thiosulfate.
16. The admixture of claim 1 wherein said first compound is present in an range of from about 0.5 to 20 weight %, based on the combined weight of said first compound and said set-accelerating compound in said admixture.
17. The admixture of claim 1 wherein said first compound is present in an range of from about 2 to 15 weight %, based on the combined weight of said first compound and said set-accelerating compound in said admixture.
18. A cement composition comprising a hydraulic cement, a set-accelerating compound and a first compound of the formula $$\begin{array}{c} HOH_2C \\ \phantom{HOH_2C}\diagdown \\ \phantom{HOH_2C}N-(L)_n-A-M \\ \phantom{HOH_2C}\diagup \\ R^1 \end{array} \quad (I)$$

wherein L is a divalent organic linking group, n is 0 or 1, A is an acidic group, R¹ is a methylol group, hydrogen, or a group which is linked to L to form an aliphatic ring structure, and M is either hydrogen or a cation.
19. The cement composition of claim 18 wherein R¹ of said first compound is hydrogen or a group which is linked to L to form an aliphatic ring structure and said admixture additionally comprises a second compound of said formula (I), wherein R¹ of said second compound is a methylol group.
20. The cement composition of claim 18 wherein A is a carboxylate group, M is an alkali metal cation, L is of the formula

and R² is selected from the group consisting of:

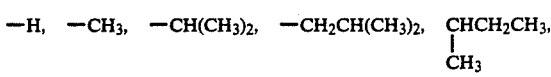

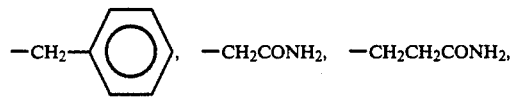, —CH₂CONH₂, —CH₂CH₂CONH₂,

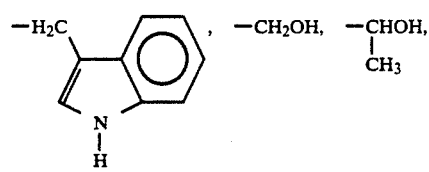, —CH₂OH, —CHOH, | CH₃

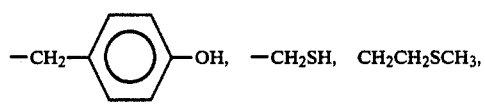, —CH₂SH, CH₂CH₂SCH₃,

—CH₂COOH, —(CH₂)₂COOH, —CH₂(CH₂)₃NH₂,

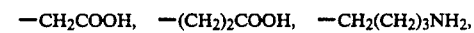

—CH₂(CH₂)₂NHC(=NH)NH₂, and 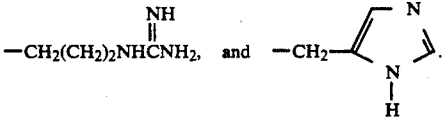.

21. The cement composition of claim 18 wherein n is one, A is a sulfonate group and L is a phenyl group, a methylene group, or an ethylene group.
22. The cement composition of claim 18 wherein n is 0 and A is a sulfonate group.
23. The cement composition of claim 18 wherein said set-accelerating compound is an alkali or alkaline earth metal salt of an organic or inorganic acid, or a mixture thereof.
24. The cement composition of claim 23 wherein said set-accelerating compound is selected from the group consisting of calcium nitrate, calcium nitrite, calcium chloride, calcium formate, and mixtures thereof.
25. The cement composition of claim 18 wherein said set-accelerating compound is alkali or alkaline earth metal thiocyanate or alkali or alkaline earth metal thiosulfate.
26. The cement composition of claim 18 wherein said first compound is present in a range of from about 0.001 to 0.5% s/s, based on the weight of said hydraulic cement.
27. The cement composition of claim 18 wherein said first compound is present in a range of from about 0.005 to 0.1% s/s, based on the weight of said hydraulic cement.

28. A method of accelerating the set of a cement composition comprising adding to a cement composition a set-accelerating compound and a first compound of the formula $$\begin{array}{c} HOH_2C \\ \phantom{HOH_2}\diagdown \\ \phantom{HOH_2C}N\text{—}(L)_n\text{—}A\text{—}M \\ \phantom{HOH_2}\diagup \\ R^1 \end{array} \quad (I)$$

wherein L is a divalent organic linking group, n is 0 or 1, A is an acidic group, $R^1$ is a methylol group, hydrogen, or a group which is linked to L to form an aliphatic ring structure, and M is either hydrogen or a cation.

29. The method of claim 28 wherein $R^1$ of said first compound is hydrogen or a group which is linked to L to form an aliphatic ring structure and said admixture additionally comprises a second compound of said formula (I), wherein $R^1$ of said second compound is a methylol group.

30. The method of claim 29 wherein said first and second compounds are present in a molar ratio of from about 1:0.001 to 0.001:1.

31. The method of claim 29 wherein said first and second compounds are present in a molar ratio of from about 1:0.25 to 1:4.

32. The method of claim 28 wherein A is a carboxylate group, M is an alkali metal cation, L is of the formula $$\begin{array}{c} H \\ | \\ -C-, \\ | \\ R^2 \end{array}$$

and $R^2$ is selected from the group consisting of:

—H, —CH$_3$, —CH(CH$_3$)$_2$, —CH$_2$CH(CH$_3$)$_2$, —CHCH$_2$CH$_3$,
                                                                    |
                                                                   CH$_3$

—CH$_2$—(phenyl), —CH$_2$CONH$_2$, —CH$_2$CH$_2$CONH$_2$,

—H$_2$C—(indolyl), —CH$_2$OH, —CHOH,
                                      |
                                     CH$_3$ —CH$_2$—(phenyl)—OH, —CH$_2$SH, CH$_2$CH$_2$SCH$_3$,

—CH$_2$COOH, —(CH$_2$)$_2$COOH, —CH$_2$(CH$_2$)$_3$NH$_2$,

NH
                          ‖
—CH$_2$(CH$_2$)$_2$NHCNH$_2$, and —CH$_2$—(imidazolyl).

33. The method of claim 29 wherein A is a carboxylate group, M is an alkali metal cation, L is of the formula $$\begin{array}{c} H \\ | \\ -C-, \\ | \\ R^2 \end{array}$$

and $R^2$ is selected from the group consisting of:

—H, —CH$_3$, —CH(CH$_3$)$_2$, —CH$_2$CH(CH$_3$)$_2$, —CHCH$_2$CH$_3$,
                                                                    |
                                                                   CH$_3$

—CH$_2$—(phenyl), —CH$_2$CONH$_2$, —CH$_2$CH$_2$CONH$_2$,

—H$_2$C—(indolyl), —CH$_2$OH, —CHOH,
                                      |
                                     CH$_3$ —CH$_2$—(phenyl)—OH, —CH$_2$SH, CH$_2$CH$_2$SCH$_3$,

—CH$_2$COOH, —(CH$_2$)$_2$COOH, —CH$_2$(CH$_2$)$_3$NH$_2$,

NH
                          ‖
—CH$_2$(CH$_2$)$_2$NHCNH$_2$, and —CH$_2$—(imidazolyl).

34. The method of claim 32 wherein $R^2$ is —H.

35. The method of claim 33 wherein $R^2$ is —H.

36. The method of claim 28 wherein n is one, A is a sulfonate group and L is a phenyl group, a methylene group, or an ethylene group.

37. The method of claim 29 wherein n is one, A is a sulfonate group and L is a phenyl group, a methylene group, or an ethylene group.

38. The method of claim 28 wherein n is 0 and A is a sulfonate group.

39. The method of claim 29 wherein n is 0 and A is a sulfonate group.

40. The method of claim 27 wherein said set-accelerating compound is an alkali or alkaline earth metal salt of an organic or inorganic acid, or a mixture thereof.

41. The method of claim 40 wherein said set-accelerating compound is selected from the group consisting of calcium nitrate, calcium nitrite, calcium chloride, calcium formate, and mixtures thereof.

42. The method of claim 27 wherein said set-accelerating compound is alkali or alkaline earth metal thiocyanate or alkali or alkaline earth metal thiosulfate.

43. The method of claim 27 wherein said first compound is present in a range of from about 0.001 to 0.5% s/s, based on the weight of said hydraulic cement.

44. The method of claim 27 wherein said first compound is present in a range of from about 0.005 to 0.1% s/s, based on the weight of said hydraulic cement.

* * * * *